(12) United States Patent
Aoyagi et al.

(10) Patent No.: US 12,546,757 B2
(45) Date of Patent: Feb. 10, 2026

(54) METHOD FOR ADJUSTING PRESSURE SENSOR AND LIQUID CHROMATOGRAPHY ANALYZER

(71) Applicant: Hitachi High-Tech Corporation, Tokyo (JP)

(72) Inventors: Shota Aoyagi, Tokyo (JP); Daisuke Akieda, Tokyo (JP); Sho Iwasa, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 323 days.

(21) Appl. No.: 18/285,286

(22) PCT Filed: Apr. 27, 2022

(86) PCT No.: PCT/JP2022/019008
§ 371 (c)(1),
(2) Date: Oct. 2, 2023

(87) PCT Pub. No.: WO2022/239652
PCT Pub. Date: Nov. 17, 2022

(65) Prior Publication Data
US 2024/0183828 A1    Jun. 6, 2024

(30) Foreign Application Priority Data
May 13, 2021   (JP) ................. 2021-081638

(51) Int. Cl.
*G01L 27/00*    (2006.01)
*G01N 30/32*    (2006.01)
*G01N 30/86*    (2006.01)

(52) U.S. Cl.
CPC ......... *G01N 30/8665* (2013.01); *G01N 30/32* (2013.01)

(58) Field of Classification Search
CPC ............... G01N 30/8665; G01N 30/32; G01N 2030/626; G01N 33/0006; G01N 33/007;
(Continued)

(56) References Cited

U.S. PATENT DOCUMENTS 5,542,286 A   8/1996  Wang et al.
5,670,707 A   9/1997  Fennell et al.
(Continued)

FOREIGN PATENT DOCUMENTS

JP    08-240578 A    9/1996
JP    10-148631 A    6/1998
(Continued)

OTHER PUBLICATIONS

International Search Report of PCT/JP2022/019008 dated Jul. 12, 2022.

*Primary Examiner* — Robert R Raevis
(74) *Attorney, Agent, or Firm* — MATTINGLY & MALUR, PC

(57) ABSTRACT

A liquid chromatography analyzer acquires a first output value P1 of a pressure sensor measured by opening a flow passage to the atmosphere or by installing, in a column installation portion, a first column that is not filled with a filler, acquires a second output value P2 of the pressure sensor measured by installing a second column having a known pressure resistance Ps in the column installation portion, and updates a gain of the pressure sensor by using the first output value P1 and the second output value P2. Thus, inspection and adjustment of the pressure sensor can be easily performed without adding a complicated mechanism.

12 Claims, 4 Drawing Sheets

(58) Field of Classification Search
CPC . G01N 2201/1288; G01N 2201/12746; G01N 2201/12715
USPC ............... 73/1.59–1.62, 23.27, 61.57, 61.58; 422/70; 210/656
See application file for complete search history.

(56) References Cited

U.S. PATENT DOCUMENTS

| | | |
|---|---|---|
| 2004/0020308 A1 | 2/2004 | Jochum |
| 2015/0168956 A1 | 6/2015 | Guan et al. |
| 2022/0050091 A1 | 2/2022 | Sugiyama et al. |
| 2022/0107293 A1 | 4/2022 | Nogami et al. |

FOREIGN PATENT DOCUMENTS

| | | | |
|---|---|---|---|
| JP | 2001-174445 A | 6/2001 | |
| JP | 3577379 B2 * | 10/2004 | ............... G01F 1/34 |
| JP | 3629329 B2 * | 3/2005 | ............. G01N 30/32 |
| JP | 2018-31630 A | 3/2018 | |
| JP | 2020-94817 A | 6/2020 | |
| WO | 2015/033664 A1 | 3/2015 | |
| WO | 2020/171240 A1 | 8/2020 | |

* cited by examiner

[FIG. 1]
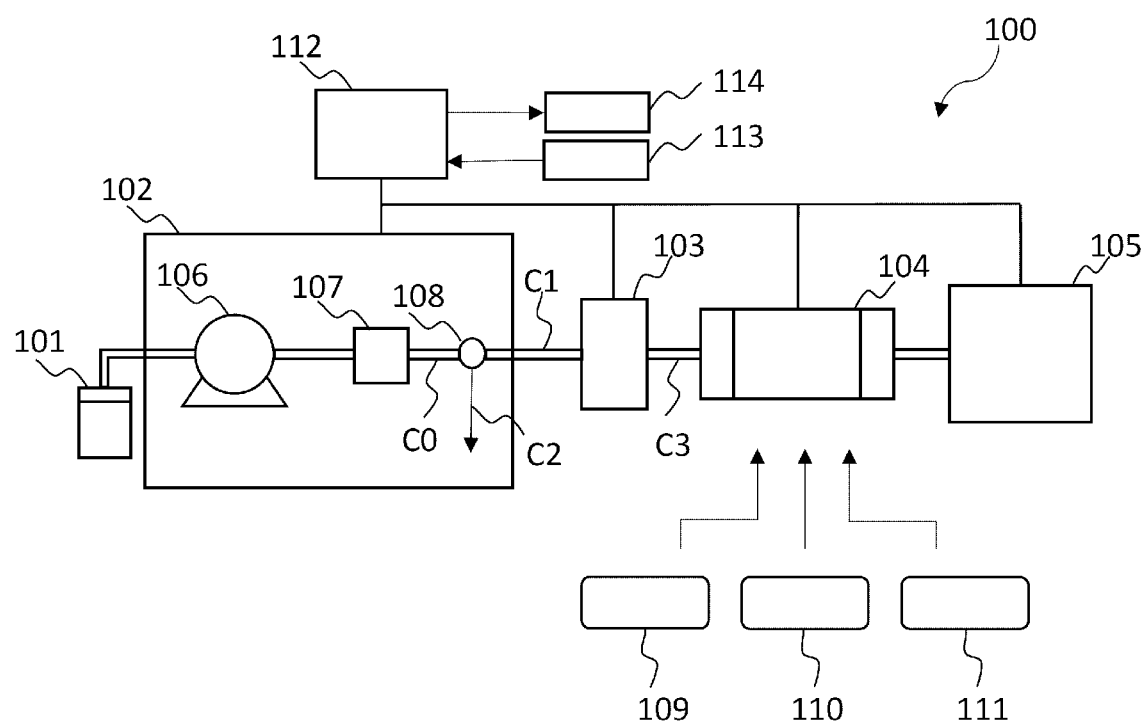

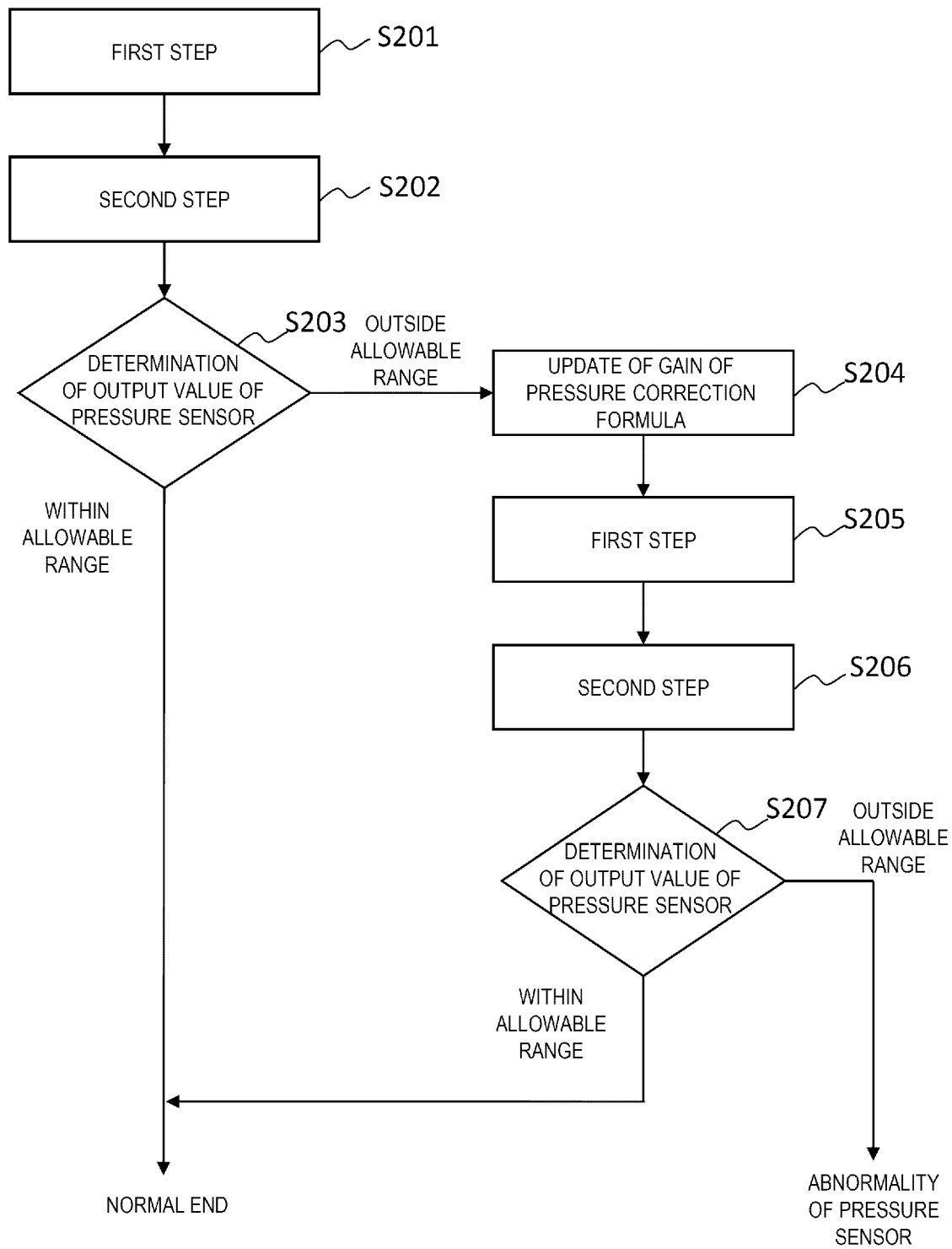

[FIG. 3]
PRESSURE CORRECTION FORMULA: $P_m = K_G(P_r - K_o)$
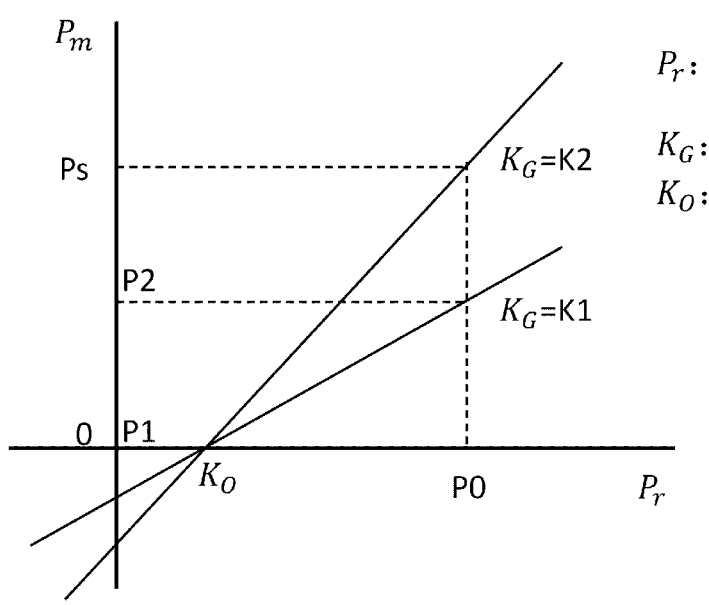
$P_m$: OUTPUT VALUE OF PRESSURE SENSOR (AFTER CORRECTION)
$P_r$: OUTPUT VALUE OF PRESSURE SENSOR (BEFORE CORRECTION)
$K_G$: GAIN
$K_O$: OFFSET

[FIG. 4]
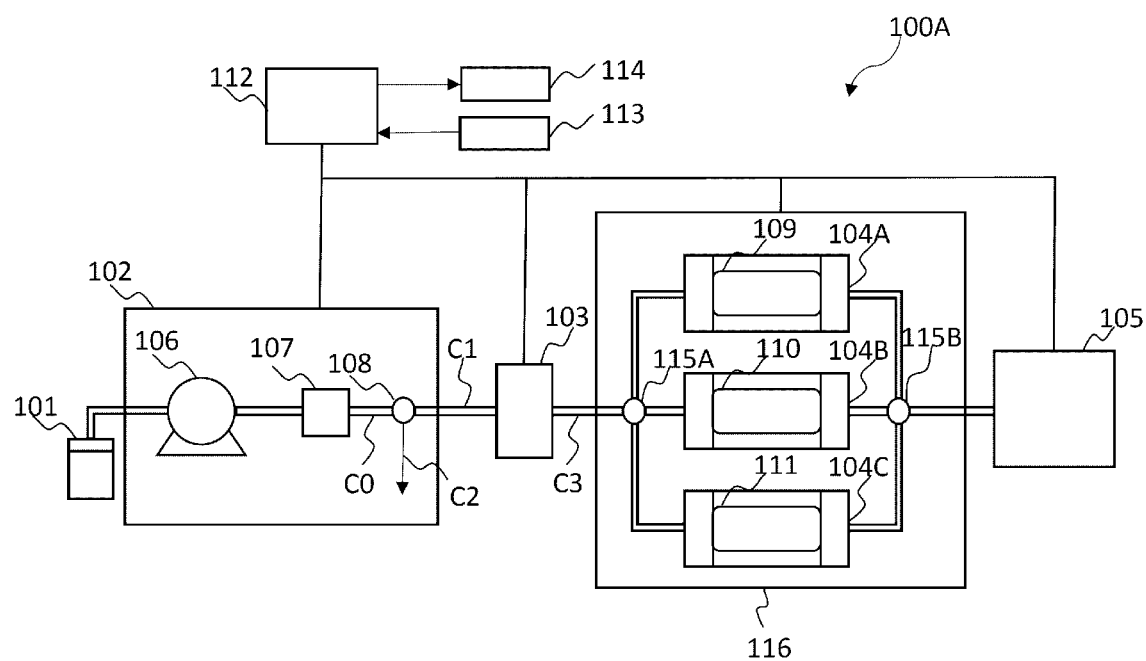

METHOD FOR ADJUSTING PRESSURE SENSOR AND LIQUID CHROMATOGRAPHY ANALYZER

TECHNICAL FIELD

The present invention relates to a method for adjusting a pressure sensor and a liquid chromatography analyzer.

BACKGROUND ART

A liquid chromatograph (LC: Liquid Chromatograph) is a chromatograph that uses liquid as a mobile phase delivered to a column to separate a sample. A liquid sample containing an object to be measured, which is introduced into an analysis flow passage from an injection portion, is pumped to the column according to the mobile phase. The liquid sample is separated into a plurality of components using a difference in affinity between the stationary phase (filler) filled in the column and the mobile phase. Each separated component is detected using a detector such as an ultraviolet/visible absorbance spectrophotometer, a fluorescence spectrophotometer, or a mass spectrometer.

The liquid chromatograph called as high performance liquid chromatograph (HPLC: High Performance Liquid Chromatography) uses the liquid that is compressed at a high pressure by a liquid feeding device with the column filling material decreased in the particle size, in order to shorten the analysis time and improve the separation performance. Particularly, a liquid chromatograph using the column with the filling material having the particle size 2 µm or smaller is called ultra high-performance liquid chromatograph (UHPLC: Ultra High Performance Liquid Chromatograph).

As a result of responding to the improvement in performance by reducing the particle size of the filling material in the column, the liquid chromatograph requires a high pressure resistance in the equipment and the flow passages that form the liquid chromatograph, especially in the equipment and the flow passages at an upstream side of the column. This is because, as the pressure of the equipment gets higher, a pressure leak from the liquid feeding device and the analytical flow passages in a high-pressure environment has a greater impact on the analytical performance. Therefore, high reliability is required of a pressure sensor that detects the pressure in the liquid feeding device and the analytical flow passages.

When the performance of the pressure sensor deteriorates due to a temporal change or a malfunction, the liquid feeding device may not satisfy the desired performance, and therefore, it is desirable to perform a periodic inspection and adjustment. Conventionally, a device user mainly performs the offset adjustment as the maintenance of the pressure sensor (Patent Literature 1). In contrast, gain adjustment of the pressure sensor is performed by an engineer with expertise, using the dedicated equipment such as an external pressure gauge and the like, which is not easy to perform.

CITATION LIST

Patent Literature

Patent Literature 1: WO/2015/033664

SUMMARY OF INVENTION

Technical Problem

It enables the inspection and the adjustment of a pressure sensor to be performed easily without adding a complicated mechanism.

Solution to Problem

A method for adjusting a pressure sensor in a liquid chromatography analyzer including a column installation portion, a liquid feeding device configured to feed a mobile phase to a column installed in the column installation portion, and a pressure sensor configured to detect pressure of a flow passage from the liquid feeding device to the column installed in the column installation portion, the method comprising: a first step of acquiring a first output value P1 of the pressure sensor measured by opening the flow passage to the atmosphere or by installing, in the column installation portion, a first column that is not filled with a filler, a second step of acquiring a second output value P2 of the pressure sensor measured by installing a second column having a known pressure resistance Ps in the column installation portion, and a gain updating step of updating a gain of the pressure sensor by using the first output value P1 and the second output value P2.

Advantageous Effects of Invention

The present invention provides a liquid chromatography analyzer that makes it possible to easily perform the inspection and the adjustment of a pressure sensor without adding a complicated mechanism and a method for adjusting the pressure sensor.

The other issues and novel features will be apparent from the description and the accompanying drawings.

BRIEF DESCRIPTION OF DRAWINGS

FIG. 1 is a diagram showing a schematic configuration of a liquid chromatography analyzer according to a first embodiment.

FIG. 2 is a flowchart of a procedure for inspecting and adjusting a pressure sensor.

FIG. 3 is a diagram illustrating processing of updating a gain of a pressure correction formula.

FIG. 4 is a diagram showing a schematic configuration of a liquid chromatography analyzer according to a second embodiment.

DESCRIPTION OF EMBODIMENTS

First Embodiment

Referring to a schematic diagram of FIG. 1, a configuration example of a liquid chromatography analyzer 100 will be described. The liquid chromatography analyzer 100 is roughly formed by a mobile phase tank 101, a liquid feeding unit 102, a sample introduction unit 103, a column installation portion 104, a detector 105, a control unit 112, an operation unit 113, and a display unit 114.

The liquid feeding unit 102, as an example, includes a liquid feeding device 106, a pressure sensor 107, a flow passage switching valve 108, a feeding flow passage C0, an analysis flow passage C1, and a discharge flow passage C2. The liquid feeding device 106 absorbs the mobile phase used to carry and separate a sample from the mobile phase tank 101, compresses the above at a high pressure, and discharges it. As the liquid feeding unit 102, there is shown a configuration example in which one type of mobile phase or a mixture of plural types of mobile phases is fed by one liquid feeding device 106.

The pressure sensor 107 detects a pressure within a pipe ranging from the feeding flow passage C0 for feeding the mobile phase in the liquid feeding unit 102 to the column installed in the column installation portion. The flow passage switching valve 108 is connected to a downstream side of the liquid feeding device 106, to connect the feeding flow passage C0 selectively with the analysis flow passage C1 connected to the sample introduction unit 103 or the discharge flow passage C2.

The column installation portion 104 is designed to be replaceable with a separation column 109 during the analysis and with an empty column 110 or a column 111 with a known pressure resistance during the inspection and the adjustment of the pressure sensor 107. The separation column 109, the empty column 110, and the column 111 with a known pressure resistance are all connected to the sample introduction unit 103 through the analysis flow passage C3. The pressure resistance value of the column 111 is Ps. During the analysis, the separation column 109 installed in the column installation portion 104 separates the sample introduced from the sample introduction unit 103 according to the mobile phase into each component. The detector 105 is connected to a downstream side of the column installation portion 104 to detect each component separated in the separation column 109.

The control unit 112 controls the liquid feeding unit 102, the sample introduction unit 103, the column installation portion 104, and the detector 105, to acquire the liquid chromatograph data and perform the data processing for the inspection and the adjustment of the pressure sensor. The operation unit 113 includes an input device such as keyboard, ten key, mouse, and the like and a user inputs various instructions into the control unit 112. The display unit 114 is a device for displaying the analytical conditions and results, which is formed by, for example, a liquid crystal display, an organic EL display, or the like.

Referring to the flow chart of FIG. 2, the inspection and the adjustment procedure of the pressure sensor 107 according to the first embodiment, which is performed by the control unit 112, will be described.

In the first process (Step S201 and Step S205), the flow passage switching valve 108 is switched to the side of the discharge flow passage C2, to acquire the output value P1 of the pressure sensor 107 by opening the flow passage having the pressure sensor 107 to the atmosphere. Alternatively, the empty column 110 which no filler is filled in, with the pressure resistance nearly close to zero, is installed in the column installation portion 104, to acquire the output value P1 of the pressure sensor 107 when feeding liquid under a predetermined feeding condition. The predetermined feeding condition is defined as the feeding condition under which the liquid chromatography analyzer 100 performs the analysis. It is the same in the second process. In either case, the true value of the output value P1 is zero.

In the second process (Step S202 and Step S206), the column 111 with a known pressure resistance (Ps) is installed in the column installation portion 104, to acquire the output value P2 of the pressure sensor 107 when feeding liquid under the predetermined feeding condition.

In the pressure sensor output value determination (Step S203 and Step S207), the following (formula 1) is used to determine whether or not it is within an allowance range ($\pm Pd$).

$$-Pd<(P2-P1)-Ps<+Pd \quad \text{(formula 1)}$$

The (formula 1) is to determine whether a difference (P2−P1) between the output value P2 of the pressure sensor 107 acquired in the second process and the output value P1 of the pressure sensor 107 acquired in the first process is within the allowance range ($\pm Pd$) with respect to the true value (Ps−0).

In Step S203, when the output value of the pressure sensor is within the allowance range, the process ends normally, while when the output value of the pressure sensor is outside the allowance range, the gain of the pressure correction formula is updated.

Referring to FIG. 3, the processing of updating the gain of the pressure correction formula (Step S204) will be described. The pressure sensor 107 corrects the detected pressure value according to the pressure correction formula and outputs it. The pressure correction formula of the pressure sensor 107 is represented by the following (formula 2) with the output value (detected value) of the pressure sensor 107 before correction as $P_r$, the output value of the pressure sensor 107 after correction as $P_m$, the gain as $K_G$, and the offset as $K_O$.

$$P_m=K_G(P_r-K_O) \quad \text{(formula 2)}$$

The gain $K_G$ is updated so that the output value $P_m$ acquired by correcting the output value $P_r$ of the pressure sensor 107 before correction according to the pressure correction formula represented by the (formula 2) may be the true value. Here, the offset $K_O$ is calculated to satisfy $0=P_m=P_r-K_O$ in the first process and updated.

The output value before correction in the second process is defined as $P_r$=P0. In the second process (Step S202), the output value P2 is calculated by the pressure correction formula before update. When the gain of the pressure correction formula before update is defined as $K_G$=K1, it satisfies the following (formula 3): (P2−P1)=$P_m$=K1 (P0−$K_O$).

In the gain updating of the pressure correction formula, when the gain in the updated pressure correction formula is defined as $K_G$=K2, since the true value of the pressure resistance value of the column 111 is Ps, the gain $K_G$ is defined to satisfy the following:

$$(Ps-0)=P_m=K2(P0-K_O) \quad \text{(formula 4)}$$

Therefore, the updated gain K2 can be acquired by using the (formula 5):

$$K2=K1\times Ps/(P2-P1) \quad \text{(formula 5)}$$

The (formula 5) can be derived according to the (formula 3) and the (formula 4).

After the gain updating of the pressure correction formula (Step S204), the first process (Step S205), the second process (Step S206), and the pressure sensor output value determination (Step S207) are performed again and when the pressure sensor output value determination (Step S207) is within the allowance range, the process ends normally. When it is outside the allowance range, it notifies the pressure sensor abnormality. In this case, there may be an abnormality occurring in the pressure sensor 107 and a leak or the other abnormality occurring in the liquid feeding device 106.

Here, although an example of opening air or using the empty column 110 is shown in the first process, since the pressure correction is a two-point correction, it is possible to correct the pressure when there are the output value of the pressure sensor 107 at a low pressure, the output value of the pressure sensor 107 at a high pressure, and the respective reference pressure values. Therefore, instead of the empty column 110, it is also possible to correct the pressure using a column with a known pressure resistance, which has a smaller pressure resistance than the column 111 with a known pressure resistance used in the second process (Step S202 and Step S206).

As mentioned above, only by replacing the separation column installed in the column installation portion with the empty column or the column with a known pressure resistance, it is possible to perform the gain adjustment of the pressure sensor 107 easily, without any expert knowledge and without adding any complicated mechanism.

Second Embodiment

This time, a liquid chromatography analyzer 100A according to a second embodiment will be described with reference to FIG. 4. In FIG. 4, the same reference numerals are attached to the same components as those of the first embodiment and the overlapping description is omitted herein. The liquid chromatography analyzer 100A roughly includes the mobile phase tank 101, the liquid feeding unit 102, the sample introduction unit 103, a column unit 116, the detector 105, the control unit 112, the operation unit 113, and the display unit 114.

The column unit 116 includes column switching valves 115A and 115B for selectively connecting the separation column 109, the empty column 110, and the column 111 with a known pressure resistance to the analysis flow passage at the upstream side and the downstream side of the column installation portions 104A to C.

The inspection and the adjustment of the pressure sensor 107 is performed in the same procedure as that of the first embodiment. When performing the first process (Step S201 and Step S205), however, the empty column 110 is connected to the analysis flow passage in the column unit 116 and when performing the second process (Step S202 and Step S206), the column 111 with a known pressure resistance is connected to the analysis flow passage in the column unit 116.

According to this, the columns can be switched by selecting the flow passage according to the column switching valves 115A and 115B, which saves the manual switching work of the columns and makes it possible for the control unit 112 to perform the inspection and the adjustment of the pressure sensor 107 automatically.

REFERENCE SIGN LIST

100, 100A: liquid chromatography analyzer
101: mobile phase tank
102: liquid feeding unit
103: sample introduction unit
104, 104A, 104B, 104C: column installation portion
105: detector
106: liquid feeding device
107: pressure sensor
108: flow passage switching valve
109: separation column
110: empty column
111: column having known pressure resistance
112: control unit
113: operation unit
114: display unit
115A, 115B: column switching valve
116: column unit

The invention claimed is:

1. A method for adjusting a pressure sensor in a liquid chromatography analyzer, the liquid chromatography analyzer including a column installation portion, a liquid feeding device configured to feed a mobile phase to a column installed in the column installation portion, and a pressure sensor configured to detect pressure of a flow passage from the liquid feeding device to the column installed in the column installation portion, the method comprising:
a first step of acquiring a first output value P1 of the pressure sensor measured by opening the flow passage to the atmosphere or by installing, in the column installation portion, a first column that is not filled with a filler;
a second step of acquiring a second output value P2 of the pressure sensor measured by installing a second column having a known pressure resistance Ps in the column installation portion; and
a gain updating step of updating a gain of the pressure sensor by using the first output value P1 and the second output value P2.

2. The method for adjusting a pressure sensor according to claim 1, wherein
the gain updating step is executed when a difference between the pressure resistance Ps and a difference exceeds an allowable range, the difference being a difference between the second output value P2 and the first output value P1.

3. The method for adjusting a pressure sensor according to claim 1, wherein
the pressure sensor is a pressure sensor configured to correct a detected pressure value $P_r$ by a pressure correction formula and output a corrected output value $P_m$,
when the gain of the pressure sensor is represented by $K_G$ and an offset of the pressure sensor is represented by $K_O$, the pressure correction formula is expressed as $P_m = K_G (P_r - K_O)$.

4. The method for adjusting a pressure sensor according to claim 3, wherein
in the first step, the offset $K_O$ of the pressure sensor is updated.

5. The method for adjusting a pressure sensor according to claim 4, wherein
in the gain updating step, when a gain $K_G$ of the pressure sensor before updating is represented by K1 and a gain $K_G$ of the pressure sensor after updating is represented by K2,
K2=K1×Ps/(P2−P1) is satisfied.

6. The method for adjusting a pressure sensor according to claim 5, wherein
after the gain updating step is performed, the first step and the second step are performed again, and an abnormality is notified when a difference between the pressure resistance Ps and a difference exceeds an allowable range, the difference being a difference between the second output value P2 and the first output value P1 that are respectively obtained by performing the second step and the first step again.

7. The method for adjusting a pressure sensor according to claim 1, wherein
the liquid chromatography analyzer includes a column unit, the column unit including a plurality of the column installation portions and a column switching valve by which any one of columns installed in the plurality of column installation portions is connected to the flow passage,
at least a third column filled with a filler is installed in one of the column installation portions of the column unit, and the second column is installed in another of the column installation portions.

8. A liquid chromatography analyzer, comprising:
a column installation portion;
a liquid feeding device configured to feed a mobile phase to a column installed in the column installation portion;
a pressure sensor configured to detect pressure of a flow passage from the liquid feeding device to the column installed in the column installation portion; and
a control unit configured to adjust the pressure sensor, wherein
the control unit is configured to:
acquire a first output value P1 of the pressure sensor measured by opening the flow passage to the atmosphere or by installing, in the column installation portion, a first column that is not filled with a filler,
acquire a second output value P2 of the pressure sensor measured by installing a second column having a known pressure resistance Ps in the column installation portion, and
update a gain of the pressure sensor by using the first output value P1 and the second output value P2.

9. The liquid chromatography analyzer according to claim 8, wherein
the pressure sensor is a pressure sensor configured to correct a detected pressure value $P_r$ by a pressure correction formula and output a corrected output value $P_m$,
when the gain of the pressure sensor is represented by $K_G$ and an offset of the pressure sensor is represented by $K_O$, the pressure correction formula is expressed as $P_m = K_G(P_r - K_O)$.

10. The liquid chromatography analyzer according to claim 9, wherein
when a gain $K_G$ of the pressure sensor before updating is represented by K1 and a gain $K_G$ of the pressure sensor after updating is represented by K2, the control unit is configured make
K2=K1×Ps/(P2−P1) satisfied.

11. The liquid chromatography analyzer according to claim 8, further comprising:
a column unit, the column unit including a plurality of the column installation portions and a column switching valve by which any one of columns installed in the plurality of column installation portions is connected to the flow passage.

12. The liquid chromatography analyzer according to claim 11, wherein
at least a third column filled with a filler is installed in one of the column installation portions of the column unit, and the second column is installed in another of the column installation portions,
in order to acquire the second output value P2, the control unit is configured to switch the column switching valve such that the flow passage is connected to the second column.

* * * * *